United States Patent [19]
Weller et al.

[11] Patent Number: 6,015,226
[45] Date of Patent: Jan. 18, 2000

[54] SCREW-TYPE EXTRUSION MACHINE HAVING TIE RODS LOADED BY A PRE-STRESSED SPRING SYSTEM

[75] Inventors: Ulrich Weller, Ingersheim; Rainer Sauter, Remseck, both of Germany

[73] Assignee: Krupp Werner & Pfleiderer GmbH, Germany

[21] Appl. No.: 09/151,787

[22] Filed: Sep. 11, 1998

[30] Foreign Application Priority Data

Sep. 17, 1997 [DE] Germany ............................ 197 40 836
Aug. 17, 1998 [DE] Germany ............................ 198 37 171

[51] Int. Cl.[7] ..................................................... B29B 7/80
[52] U.S. Cl. ........................................ 366/79; 425/192 R
[58] Field of Search ............................ 366/79–86, 88–90, 366/96–99, 318–324, 349; 425/192 R, DIG. 127, 208, 209; 100/145

[56] References Cited

U.S. PATENT DOCUMENTS 2,765,153 10/1956 Gielow et al. ............................ 366/79
3,030,898 4/1962 Freed ....................................... 366/79
4,117,583 10/1978 Gnadig et al. .
4,289,410 9/1981 Anders ..................................... 366/88
4,365,946 12/1982 Anders ..................................... 366/79
4,384,955 5/1983 Nakakura .
4,408,887 10/1983 Yamaoka ................................. 366/82
5,665,232 9/1997 Schlegel ................................. 100/145

FOREIGN PATENT DOCUMENTS 25 58 611 7/1977 Germany.
29 52 348 8/1980 Germany.
39 36 085 5/1991 Germany.

*Primary Examiner*—Charles E. Cooley
*Attorney, Agent, or Firm*—Robert F. I. Conte; Lee Mann Smith McWilliams Sweeney & Ohlson

[57] ABSTRACT

In a screw-type extrusion machine comprising a composite casing which comprises casing sections fitted together in a longitudinal direction, the casing sections being tightly tautened relative to each other by a plurality of tie rods which extend parallel to each other in the longitudinal direction of the casing on the outside thereof, it is provided with a view to avoiding any over-stressing of the tie rods in the hot condition and to avoiding any leakage between the casing sections in the case of low temperatures and non-uniform temperature distribution, that the tie rods are loaded in the longitudinal direction by a pre-stressed spring system.

9 Claims, 3 Drawing Sheets

SCREW-TYPE EXTRUSION MACHINE HAVING TIE RODS LOADED BY A PRE-STRESSED SPRING SYSTEM

BACKGROUND OF THE INVENTION

1. Field of the Invention

The invention relates to a screw-type extrusion machine comprising a composite casing which comprises casing sections fitted together in a longitudinal direction, the casing sections being tightly tautened relative to each other by a plurality of tie rods which extend parallel to each other in the longitudinal direction of the casing on the outside thereof.

2. Background Art

A screw-type extrusion machine of the generic type is known from DE39 36 085 A1.

DE 29 52 348 A1 describes a connection of casing sections, in particular for twin-screw extruders, the casing sections being connected with each other by means of pre-stressed threaded bolts which are disposed in two planes axially parallel to the double cylinder bores and diametrically opposed to each other. In order to obtain the pre-stress, the threaded bolts are heated so that when they cool down, the desired pre-stress is occasioned due to the reduction in length.

In other screw-type extrusion machines of the generic type known from prior public use, four tie rods parallel to each other are disposed in closed drill holes of the housing sections. During assembly, the housing sections are threaded on the tie rods. Provided the housing and tie rods are exposed to the same temperature during the heating-up phase and in the heated condition with no different thermal elongations occurring, a reliably tight arrangement of the housing sections relative to each other can be achieved. If, however, in the case of larger and heavier machines, regular temperature distribution is no longer ensured, problems of tightness may occur.

SUMMARY OF THE INVENTION

It is an object of the invention, also in the case of these heavier machines, to achieve a high degree of tightness at any operating temperature, i.e. even during the heating-up phase and in the heated condition, the fundamental advantages of a tie rod construction of the generic type being maintained.

According to the invention, this object is attained by each tie rod being loaded in the longitudinal direction by a pre-stressed spring system, the embodiment of each spring system as a saucer spring assembly placed on a respective tie rod being especially advantageous.

Providing a spring system according to the invention optimally evens out any irregular expansions occasioned by non-uniform temperature distribution, ensuring high tightness. The saucer spring assemblies placed on the respective tie rods enable a very favorable course of strain lines of the spring system to be put into practice, in particular to design the spring system such that on the one hand in using 50% of the maximum travel of the spring system, sufficient tightness is mustered up while on the other hand 25% of the remaining travel of the spring system are sufficient to even out the differences in length resulting from differing thermal elongation. The remaining 25% of the maximum possible travel of the spring system may be kept in reserve. When the ratio which the elongation of the tie rod bears to the elongation of the saucer spring assembly ranges from 1:1.5 to 1:5, this reflects an optimal ratio of the elongation of the tie rod and the saucer spring assembly.

In combining this with externally arranged tie rods that do not extend in closed lengthwise holes, simple mounting is attained even for heavy machines, implementation being feasible even by the aid of machinery when heavy casing sections are handled.

Even with these externally arranged tie rods of varying temperature distribution, over-stressing the tie rods is avoided, i.e. in particular the yield point of the tie rod is not transgressed. Nevertheless it is possible to muster up sufficiently high pre-stress for the required tightness to be obtained. The saucer spring assemblies also help attain the advantage that inaccuracies in tightening the screwing of the tie rods are evened out. The embodiment according to which on the one hand the saucer spring assembly supports itself on a front wall allocated to the casing and on the other hand at least indirectly on a nut screwed on a thread at the end of each tie rod ensures in particular simplicity of mounting. A compensation disk can be provided in the vicinity of the inside end of the saucer spring assembly so as to compensate tolerances. When the tie rods are disposed in externally open recesses of the casing, and when the lower tie rods are supported on a receptacle, a kind of an assembly work bench on which to place the casing sections can be created by the lower tie rods; so the casing sections need not be threaded on the tie rods.

When a control pin is provided for the verification of the pre-stress of the saucer spring assembly, an extremity of the control pin extending as far as into the vicinity of the free outer end of that saucer spring assembly, and when the control pin passes through a drill hole of the casing, the drill hole being substantially perpendicular to the longitudinal direction of the casing, this ensures optical pre-stress control, accurate pre-stress being attained when the edge of a pressure disk placed on the saucer spring assembly reaches the tip of the control pin.

Details of the invention will become apparent from the ensuing description of a preferred exemplary embodiment, taken in conjunction with the drawing.

DESCRIPTION OF THE PREFERRED EMBODIMENT

Figure 1:
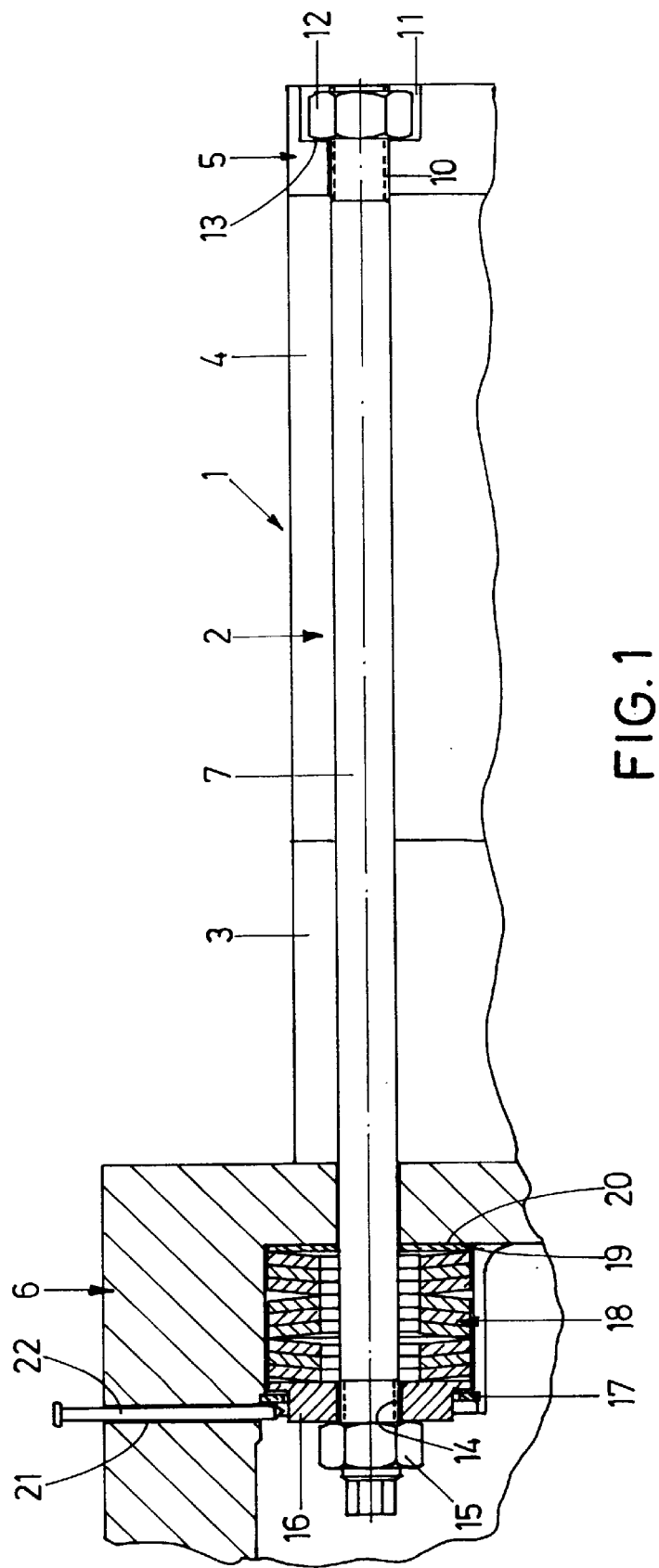
FIG. 1 is a side view, partially cut, of part of a screw-type extrusion machine according to the invention.

A screw-type extrusion machine 1 seen in the drawing comprises a screw casing 2, of which casing sections 3 and 4, an end plate 5 and a front part 6 are illustrated.

Figure 2:
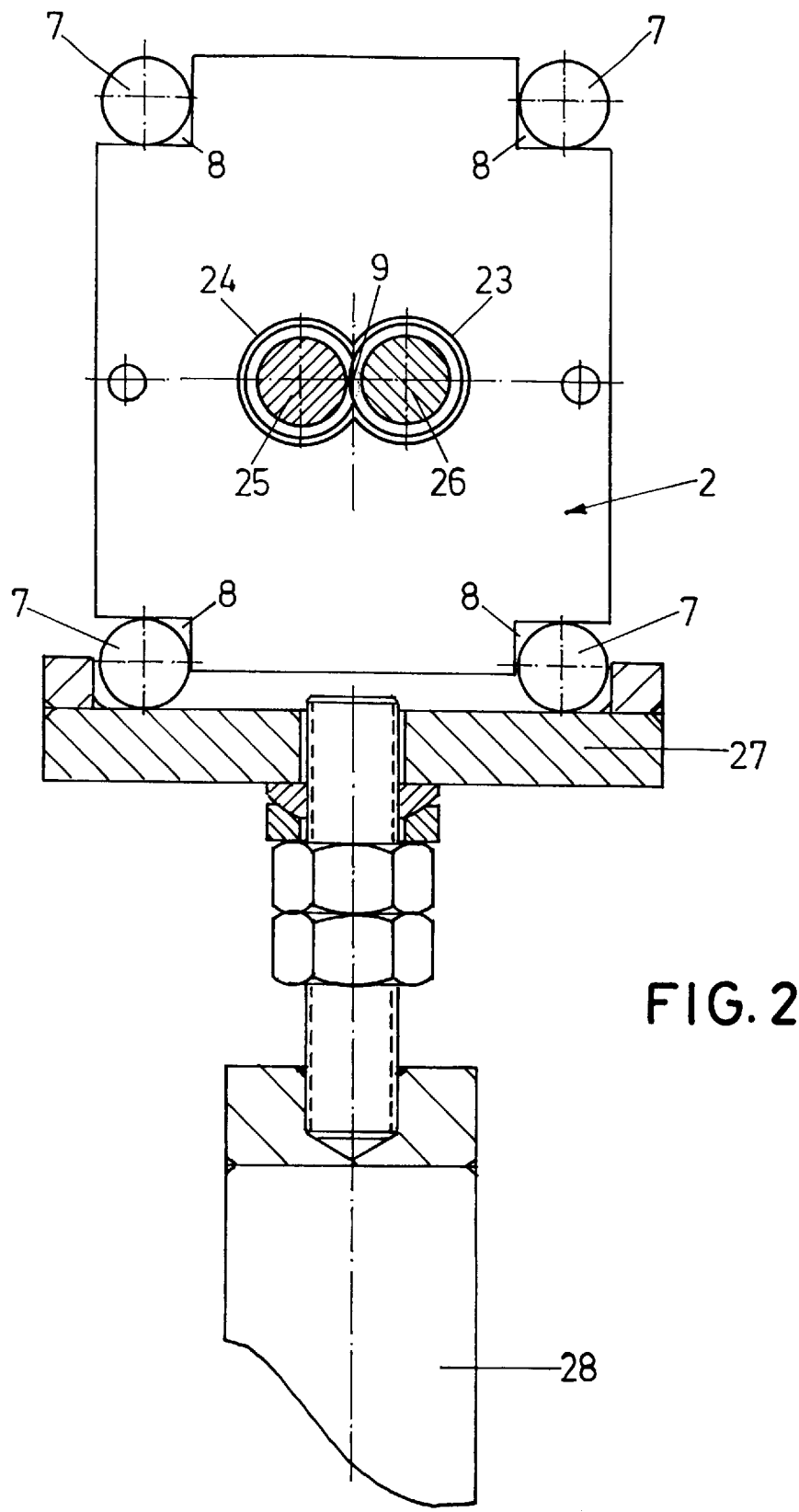
FIG. 2 is a cross-section through the screw-type extrusion machine.

The casing sections 3, 4 as well as the end plate 5 and the front part 6 are united by way of tie rods 7 which are disposed externally in recesses 8 of the casing 2 parallel to the latter's central longitudinal axis 9. As seen in FIG. 2, the recesses 8 of the casing 2 are open laterally for the tie rods 7 to be inserted therein crosswise to their longitudinal direction, i.e. crosswise to the axis 9.

At a first extremity, the tie rods 7 have a first thread 10 seen on the right in FIG. 1 which ends in a recess 11, equally laterally open, of the end plate 5, a nut 12 being screwed on in this area which supports itself on the bottom 13 of the recess 11.

At the second, opposite extremity of the tie rod 7, provision is made for a thread 14 on to which a nut 15 is screwed. The nut 15 supports itself on a pressure disk 16 which bears against a retaining ring 17. The pressure disk 16 is followed by a saucer spring assembly 18, a compensation disk 19 being provided between this saucer spring assembly 18 and an inside front wall 20 of the front part 6. The nut 15 cooperates with the pressure disk 16 to form a first abutment on the tie rod 7 and the compensation disk 19 cooperates with the front wall 20 to form a second abutment on the casing 2, each for the saucer spring assembly 18. The retaining ring 17 prevents the pressure disk 16 and the saucer spring assembly 18 from falling out when the tie rod 7 is removed.

A drill hole 21 passes through the front part 6 in a direction perpendicular to the longitudinal axis 9 of the casing 2, a control pin 22 being inserted in the hole 21 and reaching as far as into the vicinity of the pressure disk 16, it being possible thus to control the orderliness of assembly.

As seen in FIG. 2, the casing 2 possesses two lengthwise recesses 23, 24 of circular cross-section which pass through each other and in which screws 25, 26 are disposed.

As further seen in FIG. 2, the two lower tie rods 7 rest on a table 27 of a receptacle 28, which helps simplify the assembly.

Figure 3:
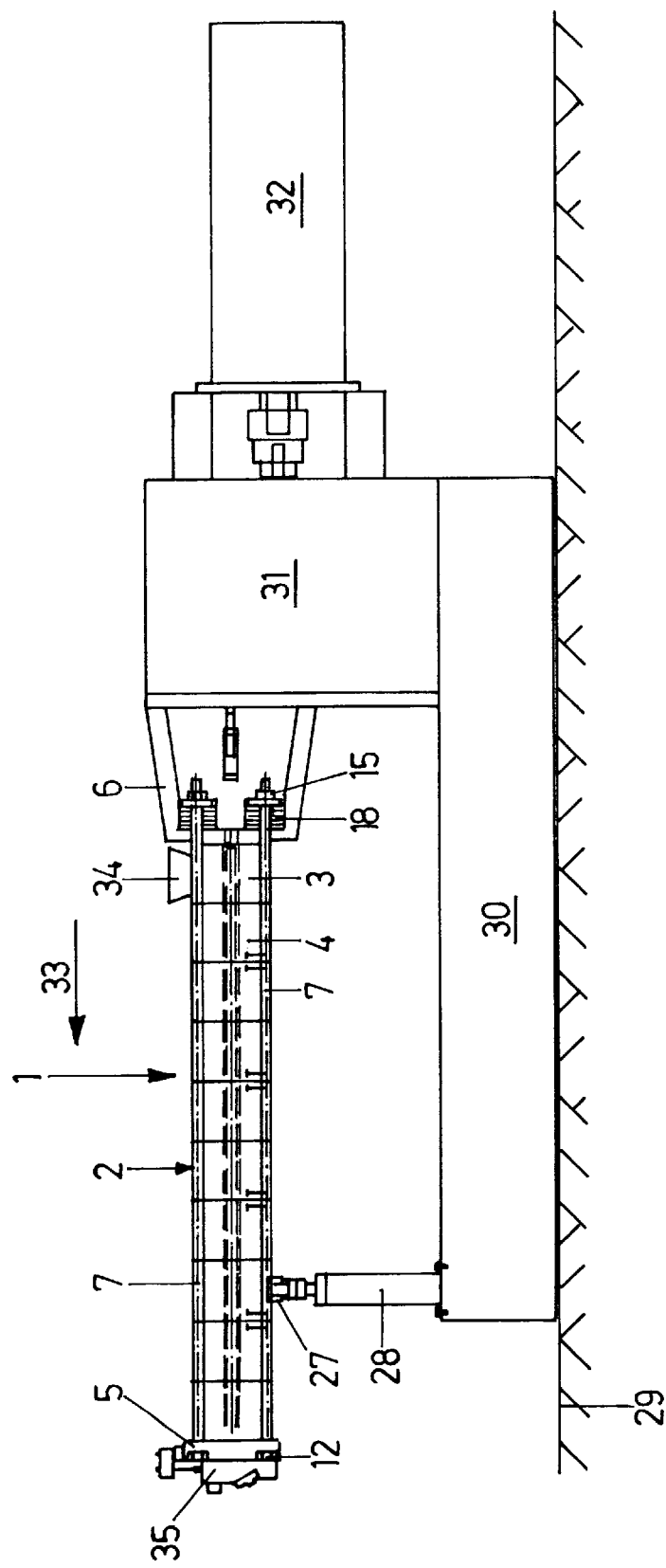
FIG. 3 is a diagrammatic illustration of a side view of a screw-type extrusion machine.

The screw-type extrusion machine 1 illustrated as a whole in FIG. 3 is an extruder. It comprises a base 30 resting on a foundation 29, a reducing and branching gear system 31 supporting itself on the base 30. A driving motor 32 with a clutch is flanged to the inlet side of the gear system 31, the front part 6, a so-called lantern, being mounted on the power take-off side of the gear system 31, and the casing 2 which constitutes the process section being attached to this lantern. This casing 2 comprises the casing sections 3 and 4 and further casing sections. The direction of operation 33 corresponds to the longitudinal direction of the casing 2. An inlet 34 for material to be processed is provided on the first casing section 3 seen in the direction of operation 33. The last housing section seen in the direction of operation 33 is provided with a die land 35 through which exits processed material. The die land 35 bears against the end plate 5. The process section which constitutes the casing 2 is supported on the base 30 by means of the receptacle 28 forming a standard. The lower tie rods 7 rest on the table 27 which is formed as a transverse beam or support.

The ratio of the elongation, defined by mm/N, which the tie rod 7 bears to the saucer spring assembly 18 ranges from 1:1.5 to 1:5. In other words, the elongation of the saucer spring assembly 18 exceeds the elongation of the tie rods 7 by 1.5 to 5 times so that any changes in length of the tie rods 7, in particular as a result of non-uniform thermal elongation of the housing 2 and the tie rods 7, can be evened out without any substantial changes in the pre-stress of the tie rods 7. This described effect occurs even if the elongation of the saucer spring assembly 18 does not substantially exceed that of the tie rods 7, since the saucer spring assembly 18 and the tie rod 7 have to be regarded as springs connected in series, i.e. the elongations will sum up. Tightening the tie rods 7 and thus pre-stressing the tie rods 7 and the saucer spring assembly 18 and clamping the casing 2 takes place at a given torque by which the first or second nut 12 and 15, respectively, is actuated. This method is used in particular when the casing 2 is assembled in the cold condition of the casing sections and the tie rods 7. If however, as happens in practice, the casing 2 is assembled in a hot operating condition of the casing sections, but in a distinctly colder condition of the tie rods 7, then it is suitable additionally to proceed with optical alignment by way of the control pin 22, it being of course possible that any other mark is provided on the front part 6. It is of decisive importance that the mark provided on the front part 6 and a mark on the tie rod 7 or the saucer spring assembly 18 will coincide for the pre-stress of the saucer spring assembly 18 or the pressure disk 16 to be made optically recognizable.

What is claimed is:

1. A screw-type extrusion machine comprising a composite casing (2) which comprises casing sections (3, 4) fitted together in a longitudinal direction of the casing (2), the casing sections (3, 4) being tightly tautened relative to each other by a plurality of tie rods (7) which extend parallel to each other in the longitudinal direction of the casing (2) on an outside thereof, wherein each tie rod (7) is loaded in said longitudinal direction by a pre-stressed spring system.

2. A screw-type extrusion machine according to claim 1, wherein each spring system is a saucer spring assembly (18) placed on a respective tie rod (7).

3. A screw-type extrusion machine according to claim 2, wherein the ratio which the elongation of the tie rod (7) bears to the elongation of the saucer spring assembly (18) ranges from 1:1.5 to 1:5.

4. A screw-type extrusion machine according to claim 2, wherein on the one hand each saucer spring assembly (18) supports itself on a front wall (20) allocated to the casing (2) and on the other hand at least indirectly on a nut (15) screwed on a thread (14) at one end of each tie rod (7).

5. A screw-type extrusion machine according to claim 2, wherein the saucer spring assembly (18) is supported by a compensation disk (19).

6. A screw-type extrusion machine according to claim 2, wherein optical control means are provided for the verification of the pre-stress of a pre-stressed saucer spring assembly (18).

7. A screw-type extrusion machine according to claim 6, wherein the optical control means comprise a control pin (22) which is provided for the verification of the pre-stress of a saucer spring assembly (18), an extremity of the control pin (22) extending as far as into the vicinity of the free outer end of that saucer spring assembly (18).

8. A screw-type extrusion machine according to claim 7, wherein the control pin (22) passes through a drill hole (21) of the casing (2), the drill hole (21) being substantially perpendicular to said longitudinal direction of the casing (2).

9. A screw-type extrusion machine according to claim 1, wherein the tie rods (7) are disposed in externally open recesses (8) of the casing (2), and wherein lower tie rods (7) are supported on a receptacle (28).

* * * * *